Oct. 7, 1958     S. STEINITZ     2,855,561
POWER TRANSMISSION
Filed Dec. 21, 1955
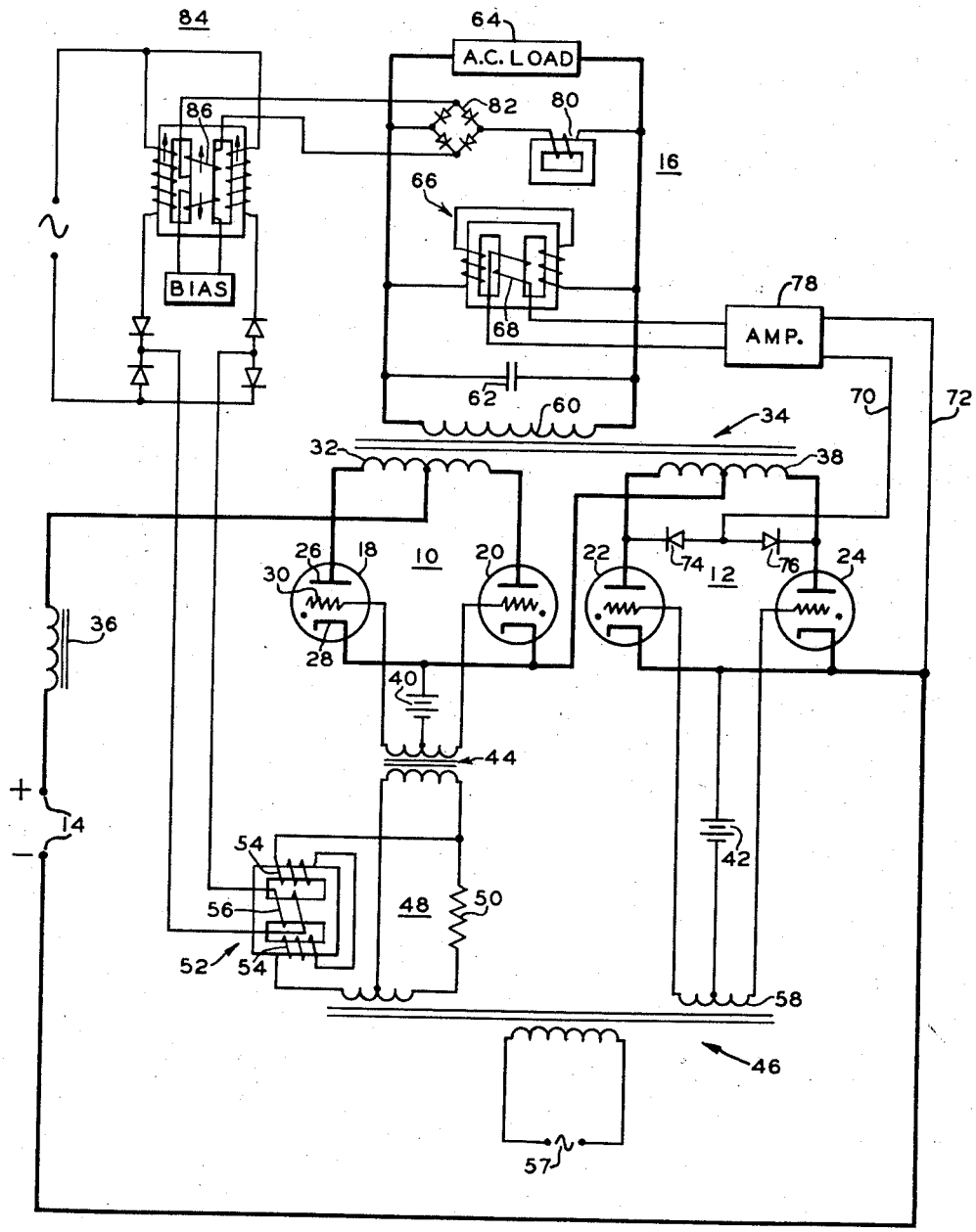
INVENTOR.
STEPHAN STEINITZ
BY *Clement J. Paynokas*
ATTORNEY

United States Patent Office 2,855,561
Patented Oct. 7, 1958

2,855,561

POWER TRANSMISSION

Stephan Steinitz, St. Louis, Mo., assignor to Vickers Incorporated, Detroit, Mich., a corporation of Michigan Application December 21, 1955, Serial No. 554,540

16 Claims. (Cl. 321—27)

This invention relates to power transmission and more particularly to electric valve converting systems.

In many cases it is necessary to closely regulate the output conditions of valve converting systems, for example inverter systems employing gaseous or vapor discharge valves for converting direct current to alternating current. Heretofore, systems which regulated the output by automatically controlling the power factor of the inverter in response to output conditions have generally been unable to effect close regulation when the input varied over a wide range, for example a 2 to 1 range.

The present invention effects very close regulation of the output even over wide input fluctuation by employing two inverters connected between the input and the output in such manner that there is an interchange of reactive power between the inverters when the respective firing angles of the two systems differ in phase, and controlling the phase angle betwen the firing angles of the inverters in response to output changes thereby to control the output by controlling the power factors of the respective systems.

It is therefore an object of the present invention to provide a novel electric valve converting system.

Another object of the present invention is to provide a novel regulating system for electric converting systems.

Another object of the present invention is to provide close regulation of an inverter system over a wide range of input or output fluctuation.

Further objects and advantages of the present invention will be apparent from the following description, reference being had to the accompanying drawing wherein a preferred form of the present invention is clearly shown.

As seen in the drawing two parallel type inverters 10 and 12 are connected between a D. C. input circuit 14 and an A. C. output circuit 16. Each inverter includes the usual pair of discharge valves shown at 18 and 20 for the inverter 10, and at 22 and 24 for the inverter 12. Each valve includes an anode 26, a cathode 28 and a control electrode 30. Any suitable valves may be used, preferably those in which the firing (starting of conduction) is controlled by the potential of the control electrode and in which conduction may be interrupted (extinguished) only by reducing the anode voltage below its critical value, for example gas or vapor discharge valves such as thyratrons.

While the inverters may be connected with their inputs in series or parallel and their outputs in series or parallel, in the specific embodiment illustrated the inputs are connected in series, and the outputs are connected in parallel to a common output circuit.

In inverter 10 the anodes of the respective valves are connected to opposite ends of a center-tapped primary winding 32 of a transformer 34, the center tap of the winding 32 being the positive input terminal of this inverter, which terminal is connected through the customary smoothing reactor 36 to the positive terminal of the input circuit 14. The anodes of the valves of the inverter 12 are likewise connected to the ends of a center-tapped primary winding 38 of the transformer 34. The center tap of the winding 38 is the positive input terminal of the inverter 12 and is connected to the cathodes of the valves 20 and 18 which constitute the negative input to inverter 10. The negative terminal of the input circuit 14 is connected to the cathodes of tubes 22 and 24 which constitute the negative input of the inverter 12. Input terminals 14 may be connected to a source of direct current which is to be converted to alternating current.

A source of direct current such as a battery 40 connected between the cathodes and the control electrodes of valves 18 and 20 acts as bias to render the valves non-conductive. Similarly a battery 42 serves the same purpose for the valves 22 and 24.

Valves 18 and 20 may be alternately fired (rendered conductive) by means of a transformer 44 connected to the control electrodes and through battery 40 to the cathodes of the valves 18 and 20. Transformer 44 is energized from a transformer 46 through any suitable phase shifting circuit 48 controlled in response to a condition of the input circuit 16, for example the voltage thereacross.

The phase shifting circuit 48 includes a resistor 50 and a saturable reactor 52 with main windings 54 and a D. C. saturating winding 56. By controlling the current through the saturating winding 56, the reactive component of the circuit 48 may be changed thus to shift the phase angle of its voltage with respect to that of the voltage of the transformer 46 whose primary is energized from any suitable A. C. generator or oscillator 57 having the desired frequency.

Valves 22 and 24 may be alternately fired by means of a center-tapped secondary winding 58 of the transformer 46, which winding is connected to the control electrodes, and through battery 42 to the cathodes of valves 22 and 24. The phase angle between the firing angles of the respective inverters 10 and 12 may be changed by adjusting the current in the saturating winding 56 of the reactor 52. The angle at which a valve fires (starts conduction) in a particular circuit is the angle of the firing point with respect to the A. C. voltage wave where the wave crosses the zero axis. Whether this angle is considered as an angle of lead or of delay with respect to the zero voltage crossing is generally immaterial so long as one concept is adhered to. However, inverters must operate at a leading power factor and it would appear more consistent to refer to the firing point as leading the voltage zero crossing point, and therefore at an angle of lead with respect to the point at which the voltage wave crosses the zero axis.

An increase of current in the control winding 56 will advance the firing angle of the valves of inverter 10 with respect to the firing angle of the valves of inverter 12. Actually, unless the firing angle of inverter 12 is fixed or "anchored," the firing angle of the valves of inverter 10 will be advanced while the firing angle of the valves of inverter 12 will be retarded an equal amount, and if the phase displacement is too great the angle at which the valves of inverter 12 receive their firing signal may have been retarded to such a point that the valves will not extinguish resulting in a short circuit overload. Means for fixing the firing angle of the valves of inverter 12 will be hereinafter described.

Transformer 34 is in the output circuit 16 and effectively couples the outputs of the two inverters in parallel to a common load circuit through a secondary winding 60 of the transformer 34. A commutating condenser 62 connected across the winding 60 commutates the current between the valves of each inverter. It functions in the same manner as the usual commutating condenser connected across the anodes of a single parallel type inverter. An A. C. load 64 is connected across the winding 60.

The firing angle of an inverter valve is dependent on the power factor of the inverter output. As the power factor of the inverter output circuit becomes more leading, the firing angle advances. However, when the power factor becomes less leading, the firing angle is retarded. For a given power factor the inverter valve will have a particular firing angle. Thus, if the power factor can be fixed the firing angle will be fixed.

In the particular circuit illustrated, a predetermined firing angle is maintained for the valves of inverter 12 by adding or subtracting reactance from the output circuit in response to the inverse voltage across the valves of the inverter 12. To effect this a saturable reactor 66 across the output circuit is controlled by a saturating winding 68 energized by the inverse voltages of the valves 22 and 24. A measure of the inverse voltages is obtained through conductors 70 and 72 connected across each tube through rectifiers 74 and 76 poled to conduct current in response to the inverse voltages across the valves. This current, which may be referred to as the inverse signal, may be amplified by any suitable amplifier 78 before it is supplied to the saturating winding 68. If the power factor as seen by the output of inverter 12 changes, the inverse signal changes to affect the reactor 66 in the proper sense to compensate for the power factor change and thereby hold the power factor as seen by inverter 12 fixed. For example, if the power factor becomes less leading, the inverse signal decreases thereby lowering the saturation of the reactor 66 and making the power factor more leading thus restoring the original power factor and advancing the firing point of the valves 22 and 24 back to its original position. Thus, the power factor as seen by the output of inverter 12 is held substantially fixed, and consequently the firing angle of the valves of inverter 12 is held substantially fixed.

While the firing angle of the valves in inverter 12 is held fixed, the firing angle of the valves in inverter 10 is changed with respect to that in inverter 12 in response to changes of the output voltage. This is accomplished by controlling the phase shifting reactor 52 with current obtained from any suitable voltage sensing circuit connected to the output circuit, for example including as a voltage detector a saturating nonlinear reactor 80 and a rectifier 82 whose output is amplified and inverted by any suitable amplifier 84. Due to its nonlinearity, reactor 80 is sensitive to voltage changes and, when the operating range used is along the steep portion of the detector output characteristic, it produces a substantial increment of change in current supplied to the rectifier 82 in response to a relatively small increment of change in voltage across the output circuit. Amplifier 84 may be, for example, the self-saturating magnetic amplifier shown whose output increases as the control current supplied by the rectifier 82 to the amplifier control winding 86 decreases. Current from the output of amplifier 84 is supplied to the saturating winding 56 of the phase shifting reactor 52. By means of this arrangement changes of the output voltage will change the firing angle of the valves of inverter 10 with respect to the firing angle of the valves of inverter 12. For example, when the voltage across the output circuit decreases, the current from the rectifier 82 decreases thus increasing the output of the amplifier 84 and raising the saturation of the reactor 52. This in turn causes the phase shifting circuit 48 to advance the firing angle of the valves 18 and 20 with respect to the firing angle of the valves 22 and 24, thereby raising the output voltage back to its original predetermined value.

The output voltage is regulated by shifting the phase between the valve firing angle of inverter 10 and the valve firing angle of inverter 12 in response to the voltage detecting or sensing circuit. In the meantime the firing angle of the valves of inverter 12 is held fixed by compensating for any changes in the power factor as seen by the inverter 12.

Let it be assumed that the apparatus is adjusted so that with a certain input voltage, a certain load, and with the valve firing angle of inverter 10 advanced with respect to the valve firing angle of inverter 12, the output voltage is at the desired regulated level. Further, let it be assumed that under these conditions reactors 52 and 66 are at a saturation level which permits adjustment of their reactance in either direction by suitably changing the current to their respective saturating windings. Although the output circuit will have a particular leading power factor, the inverters operating at different firing angles will be sharing the load and power factor unequally. Likewise the distribution of the direct current supply voltage across both inverters will be unequal. Inverter 10, because of an earlier firing point, will be operating at a more leading power factor and have less of the direct current input voltage across it.

Suppose under the above conditions the input voltage drops. This, of course, will cause a decrease of the voltage across the A. C. output circuit of the inverter system. The voltage sensing signal from the detector 80 and rectifier 82 will be decreased, thus driving the output of the amplifier 84 upward and thereby increasing the saturation of the reactor 52. This action on reactor 52 allows more reactive current to flow in the phase shifting circuit 48 thereby further advancing the valve firing point of the inverter 10 with respect to the valve firing point of the inverter 12. This raises the output voltage of inverter 10 and consequently increases the output voltage across the A. C. load 64. However, inverter 10 by its more advanced firing angle operates at a more leading power factor which, by interchange of reactive power, tends to affect the power factor of inverter 12 by making it less leading. Power factor change in inverter 12 is resisted by the compensating circuit which includes the reactor 66 whose reactance is controlled in response to the inverse voltages across valves 22 and 24. In this particular instance where there is a tendency to make the power factor less leading in inverter 12, its inverse voltages are decreased thereby decreasing the signal current to the saturating winding 68 of reactor 66, thus making the output circuit power factor more leading, and lifting or restoring the original desired power factor to inverter 12. Thus, the firing point or angle of inverter 12 is held fixed.

In further explanation of the latter power factor compensation circuit, it is noted that the time interval or base of the inverse voltage wave across an inverter valve bears a definite relation to the inverter firing angle and power factor. In turn, the average inverse voltage being a function of its time base may be used to detect changes in power factor with considerable accuracy. As hereinbefore described, the inverse voltage is employed to control the power factor compensation for the inverter 12.

For further understanding with regard to the corelation of the firing angle and power factor of an inverter, it may be said that if the firing angle is considered the angle by which the firing point leads the zero crossing of the A. C. voltage wave, then this lead angle may be considered the power factor, because since current conduction begins at the firing point, the current leads the voltage by the angle between the firing point and the zero crossing of the voltage wave.

While the form of embodiment of the invention as herein disclosed constitutes a preferred form, it is to be understood that other forms might be adopted, all coming within the scope of the claims which follow.

What is claimed is as follows.

1. An electric current converting system comprising a D. C. input circuit, an A. C. output circuit, a plurality of inverters connected between the input and output circuits, each inverter including valve means, means for rendering the valve means of each inverter alternately conductive and nonconductive, means responsive to departures from a desired norm of the A. C. output circuit power factor seen by one of said inverters for restoring to said norm the power factor seen by said one inverter, and means for adjusting the phase angle between the valve firing angles of the respective inverters.

2. An electric current converting system comprising a D. C. input circuit, an A. C. output circuit, a plurality of inverters connected between the input and output circuits, each inverter including valve means, means for rendering the valve means of each inverter alternately conductive and nonconductive, regulating means for maintaining a predetermined firing angle for the valve means of one of the inverters, said regulating means including means responsive to departures from said predetermined firing angle of the valve means of said one inverter for restoring said predetermined firing angle to the valve means of said one inverter, and means for adjusting the phase angle between the valve firing angles of the respective inverters.

3. An electric current converting system comprising a D. C. input circuit, an A. C. output circuit, a plurality of inverters connected between the input and output circuits, each inverter including valve means, means for rendering the valve means of each inverter alternately conductive and nonconductive, means responsive to departures from a desired norm of the A. C. output circuit power factor seen by one of said inverters for restoring to said norm the power factor seen by said one inverter, and means responsive to an electrical condition of the system for adjusting the phase angle between the firing angles of the valve means of the respective inverters.

4. An electric current converting system comprising a D. C. input circuit, an A. C. output circuit, a plurality of inverters connected between the input and output circuits, each inverter including valve means, means for rendering the valve means of each inverter alternately conductive and nonconductive, means responsive to departures from a desired norm of the A. C. ouput circuit power factor seen by one of said inverters for restoring to said norm the power factor seen by said one inverter, and means responsive to the voltage of the output circuit for adjusting the phase angle between the firing angles of the valve means of the respective inverters.

5. An electric current converting system comprising a D. C. input circuit, an A. C. output circuit, a plurality of inverters connected between the input and output circuits, each inverter including valve means, means for rendering the valve means of each inverter alternately conductive and nonconductive, regulating means for maintaining a predetermined firing angle for the valve means of one of the inverters, said regulating means including means responsive to departures from said predetermined firing angle of the valve means of said one inverter for restoring said predetermined firing angle to the valve means of said one inverter, and means responsive to the voltage of the output circuit for adjusting the phase angle between the firing angles of the valve means of the respective inverters.

6. An electric current converting system comprising a D. C. input circuit, an A. C. output circuit, a plurality of inverters connected between the input and output circuits, each inverter including valve means, means for rendering the valve means of each inverter alternately conductive and nonconductive, means responsive to changes of an electrical condition of said output circuit sensed by one of said inverters for maintaining a predetermined firing angle for the valve means of said one inverter, and means for adjusting the phase angle between the firing angles of the valve means of the respective inverters.

7. An electric current converting system comprising a D. C. input circuit, an A. C. output circuit, a plurality of inverters connected between the input and output circuits, each inverter including valve means, means for rendering the valve means of each inverter alternately conductive and nonconductive, means including adjustable reactance means in said output circuit responsive to changes of an electrical condition of said output circuit sensed by one of said inverters for maintaining a predetermined firing angle for the valve means of said one inverter, and means for adjusting the phase angle between the firing angles of the valve means of the respective inverters.

8. An electric current converting system comprising a D. C. input circuit, an A. C. output circuit, a plurality of inverters connected between the input and output circuits, each inverter including valve means, means for rendering the valve means of each inverter alternately conductive and nonconductive, means responsive to changes of an electrical condition of said output circuit sensed by one of said inverters for maintaining a predetermined firing angle for the valve means of said one inverter, and means responsive to an electrical condition of the system for adjusting the phase angle between the firing angles of the valve means of the respective inverters.

9. An electric current converting system comprising a D. C. input circuit, an A. C. output circuit, a plurality of inverters connected between the input and output circuits, each inverter including valve means, means for rendering the valve means of each inverter alternately conductive and nonconductive, means responsive to the inverse voltages across the valve means of one inverter for maintaining a predetermined firing angle for the valve means of said one inverter, and means for adjusting the phase angle between the firing angles of the valve means of the respective inverters.

10. An electric current converting system comprising a D. C. input circuit, an A. C. output circuit, a plurality of inverters connected between the input and output circuits, each inverter including valve means, means for rendering the valve means of each inverter alternately conductive and nonconductive, means including adjustable reactance means in said output circuit responsive to the inverse voltages across the valve means of one inverter for maintaining a predetermined firing angle for the valve means of said one inverter, and means for adjusting the phase angle between the firing angles of the valve means of the respective inverters.

11. An electric current converting system comprising a D. C. input circuit, an A. C. output circuit, a plurality of inverters connected between the input and output circuits, each inverter including valve means, means for rendering the valve means of each inverter alternately conductive and nonconductive, means including adjustable reactance means in said output circuit responsive to the inverse voltages across the valve means of one inverter for maintaining a predetermined firing angle for the valve means of said one inverter, and means responsive to the voltage across the output circuit for adjusting the phase angle between the firing angles of the valve means of the respective inverters.

12. An electric current converting system comprising a D. C. input circuit, an A. C. output circuit, a plurality of inverters connected between the input and output circuits, the inputs of said inverters being connected in series, the outputs of said inverters being connected in parallel to said output circuit, each inverter including valve means, means for rendering the valve means of each inverter alternately conductive and nonconductive, means responsive to departures from a desired norm of the A. C. output circuit power factor seen by one of said inverters for restoring to said norm the power factor seen by said one inverter, and means for adjusting the phase angle between the valve firing angles of the respective inverters.

13. An electric current converting system comprising a D. C. input circuit, an A. C. output circuit, a plurality of inverters connected between the input and output circuits, the inputs of said inverters being connected in series, the outputs of said inverters being connected in parallel to said output circuit, each inverter including valve means, means for rendering the valve means of each inverter alternately conductive and nonconductive, regulating means for maintaining a predetermined firing angle for the valve means of one of the inverters, said regulating means including means responsive to departures from said predetermined firing angle of the valve means of said one inverter for restoring said predetermined firing angle to the valve means of said one inverter, and means for adjusting the phase angle between the valve firing angles of the respective inverters.

14. An electric current converting system comprising a D. C. input circuit, an A. C. output circuit, a plurality of inverters connected between the input and output circuits, the inputs of said inverters being connected in series, the outputs of said inverters being connected in parallel to said output circuit, each inverter including valve means, means for rendering the valve means of each inverter alternately conductive and nonconductive, means responsive to the inverse voltages across the valve means of one of said inverters for maintaining a predetermined firing angle for the valve means of said one inverter, and means responsive to the voltage of the output circuit for adjusting the phase angle between the firing angles of the valve means of the respective inverters.

15. An electric current converting system comprising a D. C. input circuit, an A. C. output circuit, a plurality of inverters connected between the input and output circuits, the inputs of said inverters being connected in series, the outputs of said inverters being connected in parallel to said output circuit, each inverter including valve means, means for rendering the valve means of each inverter alternately conductive and nonconductive, means responsive to changes of an electrical condition of said output circuit sensed by one of said inverters for maintaining a predetermined firing angle for the valve means of said one inverter, and means responsive to an electrical condition of the system for adjusting the phase angle between the firing angles of the valve means of the respective inverters.

16. An electric current converting system comprising a D. C. input circuit, an A. C. output circuit, a plurality of inverters connected between the input and output circuits, the inputs of said inverters being connected in series, the outputs of said inverters being connected in parallel to said output circuit, each inverter including valve means, means for rendering the valve means of each inverter alternately conductive and nonconductive, means including adjustable reactance means in said output circuit responsive to the inverse voltages across the valve means of one inverter for maintaining a predetermined firing angle for the valve means of said one inverter, and means responsive to the voltage across the output circuit for adjusting the phase angle between the firing angles of the valve means of the respective inverters.

References Cited in the file of this patent

UNITED STATES PATENTS

| | | |
|---|---|---|
| 1,929,726 | Willis | Oct. 10, 1933 |
| 1,944,060 | Bedford | Jan. 16, 1934 |
| 2,034,126 | Willis | Mar. 17, 1936 |
| 2,220,747 | Westendorp | Nov. 5, 1940 |
| 2,547,162 | Kidd | Apr. 3, 1951 |